United States Patent
Chen et al.

(10) Patent No.: US 11,642,649 B2
(45) Date of Patent: May 9, 2023

(54) **METHOD FOR PREPARING BIOCHAR FROM PHOSPHORIC ACID-MODIFIED *ENTEROMORPHA PROLIFERA*, AND USE OF BIOCHAR IN REMOVAL OF CADMIUM**

(71) Applicants: Tianjin University, Tianjin (CN); BCIG ENVIRONMENTAL REMEDIATION CO., LTD., Tianjin (CN)

(72) Inventors: Guanyi Chen, Tianjin (CN); Chuanbin Wang, Tianjin (CN); Chengliang Yang, Tianjin (CN); Xiangping Li, Tianjin (CN); Beibei Yan, Tianjin (CN); Bin Liu, Tianjin (CN); Juping Liu, Tianjin (CN); Zhenping Su, Tianjin (CN); Ding Li, Tianjin (CN); Xinpei Liu, Tianjin (CN); Bo Li, Tianjin (CN)

(73) Assignees: Tianjin University, Tianjin (CN); BCIG ENVIRONMENTAL REMEDIATION CO., LTD., Tianjin (CN)

( * ) Notice: Subject to any disclaimer, the term of this patent is extended or adjusted under 35 U.S.C. 154(b) by 194 days.

(21) Appl. No.: 17/024,950

(22) Filed: Sep. 18, 2020

(65) Prior Publication Data
US 2021/0086163 A1 Mar. 25, 2021

(30) Foreign Application Priority Data
Sep. 19, 2019 (CN) .......................... 201910889438.2

(51) Int. Cl.
B01J 20/30 (2006.01)
B01J 20/20 (2006.01)
B01J 20/32 (2006.01)
C02F 1/28 (2023.01)
C02F 101/20 (2006.01)

(52) U.S. Cl.
CPC ........... *B01J 20/20* (2013.01); *B01J 20/3021* (2013.01); *B01J 20/3078* (2013.01); *B01J 20/3234* (2013.01); *C02F 1/283* (2013.01); *C02F 2101/20* (2013.01)

(58) Field of Classification Search
None
See application file for complete search history.

(56) References Cited

FOREIGN PATENT DOCUMENTS

JP 2014503638 * 2/2014

* cited by examiner

Primary Examiner — Sheng H Davis
(74) Attorney, Agent, or Firm — Dorsey & Whitney LLP

(57) ABSTRACT

The disclosure discloses a method for preparing biochar from *Enteromorpha prolifera* and use of the biochar. The method includes: subjecting *Enteromorpha prolifera* to lyophilization, then impregnating lyophilized *Enteromorpha prolifera* with phosphoric acid, and drying to a constant weight; grinding a dried mixture in a mortar, and then subjecting a ground sample to activation treatment in a tube furnace at 400° C. to 1,000° C. under a nitrogen atmosphere; and boiling an obtained solid product with concentrated hydrochloric acid, then washing with ultrapure water, and drying to a constant weight to obtain *Enteromorpha prolifera* biochar. The biochar is used in adsorption of cadmium. The method for removing cadmium using *Enteromorpha prolifera* biochar provided by the disclosure exhibits an extremely high adsorption and removal capacity for cadmium, with an adsorption capacity of biochar up to 250 mg/g or more.

7 Claims, 4 Drawing Sheets

METHOD FOR PREPARING BIOCHAR FROM PHOSPHORIC ACID-MODIFIED *ENTEROMORPHA PROLIFERA*, AND USE OF BIOCHAR IN REMOVAL OF CADMIUM

TECHNICAL FIELD

The disclosure belongs to the technical field of water treatment, and particularly, relates to a method for preparing biochar from *Enteromorpha prolifera*, and use of the biochar in adsorption and removal of heavy metals in water.

BACKGROUND

Cadmium is a non-essential heavy metal with high toxicity, which enters the human body and other organisms through contaminated water and food chain. With a biological half-life as long as 2 to 3 years, cadmium is not easily degradable and will cause persistent harm. It is of great significance to develop effective water treatment technologies for treating cadmium polluted wastewater. Traditional heavy metal treatment methods mainly include coagulation, chemical precipitation, ion exchange, adsorption, and other methods. The adsorption method is a fast and general method due to its cost-effectiveness, simple operation and effective implementation. Developing cost-effective, efficient and non-toxic new adsorbents is a hot research direction in the field of water treatment and purification.

Activated carbon is currently the most widely used adsorbent, but activated carbon is not suitable for large-scale promotion and application due to its high price. Biochar has characteristics of low cost, a highly-aromatic structure, abundant functional groups on its surface, and a relatively-large specific surface area. These structural characteristics enable biochar to have excellent adsorption properties and to be used as a prominent adsorption material for heavy metal pollutants, which is helpful to provide an alternative material for activated carbon, allowing for large-scale industrial utilization. At present, the research on raw materials for preparing biochar is mainly focusing on agricultural, forestry and other wastes, and the research on marine algae is relatively scarce. The structure of algae is quite different from that of agricultural crops such as land straws. Studying on algae is beneficial to compensate for the shortage of research content about biochar raw materials and to provide new raw materials for preparing highly-efficient biochar adsorbents.

*Enteromorpha prolifera* is a non-toxic algae, but like red tide, *Enteromorpha prolifera* can also shade the sea from sunlight and thus affect the growth of benthic algae due to its mass propagation. Moreover, dead *Enteromorpha prolifera* also consumes oxygen in seawater, and chemicals secreted by *Enteromorpha prolifera* is likely to cause adverse effects on other marine life. *Enteromorpha prolifera*, which has a long strip structure and is inherently porous, is a superior material for preparing biochar. The biochar obtained by burning has an excellent pore structure and a superior ability to remove heavy metals in water. Therefore, the purpose of "treating waste with waste" can be achieved.

At present, with a relatively-low adsorption capacity, biochar is difficult to be used widely. The disclosure uses the biochar prepared from phosphoric acid-modified *Enteromorpha prolifera* to adsorb cadmium in water, which exhibits an adsorption capacity that has basically met the requirements of industrial utilization. The disclosure provides new materials and new methods for the production and use of algae biochar while offering research data for scientific researchers.

SUMMARY

In view of the problem that there is an excessively-high content of cadmium in water at present, the disclosure is mainly intended to provide a method for removing cadmium using *Enteromorpha prolifera* biochar. The method is intended to greatly improve the adsorption performance of *Enteromorpha prolifera* biochar, and retain the oxygen-containing functional groups in *Enteromorpha prolifera* through biological treatment. In addition, the method can activate and improve the surface properties of *Enteromorpha prolifera* biochar, and solve the technical problem that the current biochar has a low adsorption efficiency for cadmium.

In order to achieve the above objective, the disclosure provides a method for preparing biochar from *Enteromorpha prolifera*. In addition, the disclosure also provides the biochar prepared by the method and the use thereof in adsorption of cadmium in water.

The specific technical solutions are as follows:

The disclosure provides a method for preparing biochar from *Enteromorpha prolifera*, including: subjecting *Enteromorpha prolifera* to lyophilization, then impregnating lyophilized *Enteromorpha prolifera* with phosphoric acid, and drying to a constant weight; grinding a dried mixture in a mortar, and then subjecting a ground sample to activation treatment in a tube furnace at 400° C. to 1,000° C. under a nitrogen atmosphere; and boiling an obtained solid product with concentrated hydrochloric acid, then washing with ultrapure water, and drying to a constant weight to obtain *Enteromorpha prolifera* biochar.

In the disclosure, *Enteromorpha prolifera* is adopted as a raw material; the *Enteromorpha prolifera* and phosphoric acid are used at a weight ratio of 1:(2-5); and a phosphoric acid solution has a weight concentration of 30% to 90%.

During the impregnation process, the *Enteromorpha prolifera* is impregnated with the phosphoric acid for 6 h to 24 h.

The drying is conducted at 90° C. to 105° C. for 12 h to 24 h.

During the pyrolysis process, the temperature is raised at a rate of 5° C./min to 20° C./min, and the pyrolysis is conducted for 1 h to 5 h.

A biochar solid product is boiled for 0.5 h to 2 h with a concentrated hydrochloric acid solution having a concentration of 3 mol/L to 12 mol/L.

The carbonization is conducted with a phosphoric acid modifier at a corresponding temperature. The mixture is subjected to carbonization during the temperature range for the specified time, then cooled, boiled, filtered, and washed with deionized water to obtain biochar.

The disclosure also provides use of the biochar in adsorption of cadmium, where, the biochar is contacted with a sample solution including cadmium.

For example, the adsorption process is as follows: a water sample including cadmium is subjected to atomic absorption spectroscopy (AAS) to obtain the ion concentration of the water sample; then the biochar and the water sample are mixed in a centrifuge tube according to a biochar-cadmium ratio of 1 g:0.375 mg to 1 g:3.125 mg for test; and the resulting mixture is shaken in a constant-temperature shaker at 25° C. for 24 h, and then filtered. The adsorption capacity is calculated based on the difference between the cadmium concentrations before and after the adsorption.

The *Enteromorpha prolifera* biochar is added at an amount of 0.01 g/100 ml to 0.10 g/100 ml, and the adsorption is conducted for 24 h. The adsorption capacity of biochar can reach more than 250 mg/g, indicating an excellent heavy metal-adsorbing effect.

Compared with the prior art, the above technical solutions conceived by the disclosure can achieve the following beneficial effects:

The method for removing cadmium using *Enteromorpha prolifera* biochar provided in the disclosure preliminarily improves the physical and chemical properties of the surface of *Enteromorpha prolifera* biochar while retaining the chemical properties of the biochar, which provides a basis for post-treatment, and provides a new adsorption material for the adsorption of cadmium.

The method provided by the disclosure improves the physical and chemical properties of biochar to a greater extent by impregnation with phosphoric acid. Compared with chemical precipitation, membrane separation, and biodegradation, the method for adsorbing and removing cadmium in water using *Enteromorpha prolifera* based biochar of the disclosure involves simple operations and low cost, and has a promising prospect in industrialization.

The method provided by the disclosure gives full play to the modification effect of the modifier on biochar, turns *Enteromorpha prolifera* from waste into treasure, provides an effective solution for the utilization of marine invasive plants, and alleviates the marine environmental pollution.

Moreover, the method provided in the disclosure is not limited to modification of *Enteromorpha prolifera* biochar, but can also be used to modify biochar prepared from other materials so that the biochar can be subjected to resourceful treatment and then applied to the adsorption and removal of cadmium in water.

The biochar of the disclosure exhibits an extremely high adsorption and removal capacity for cadmium, with an adsorption capacity up to 250 mg/g or more. The adsorption and removal of cadmium is harder than the adsorption and removal of other heavy metals (lead, zinc, chromium, copper, etc.). Moreover, the biochar prepared in the disclosure can also be used in the adsorption and removal of other heavy metals (lead, zinc, chromium, copper, etc.) in water.

DETAILED DESCRIPTION

In order to make the objectives, technical solutions and advantages of the disclosure clearer and more comprehensible, the disclosure is further described in detail below with reference to the examples. It should be understood that the specific examples described herein are merely intended to explain the disclosure, rather than to limit the disclosure. Further, the technical features involved in the various examples of the disclosure described below may be combined with each other as long as they do not constitute a conflict with each other.

Examples are as follows:

Example 1

Figure 1:
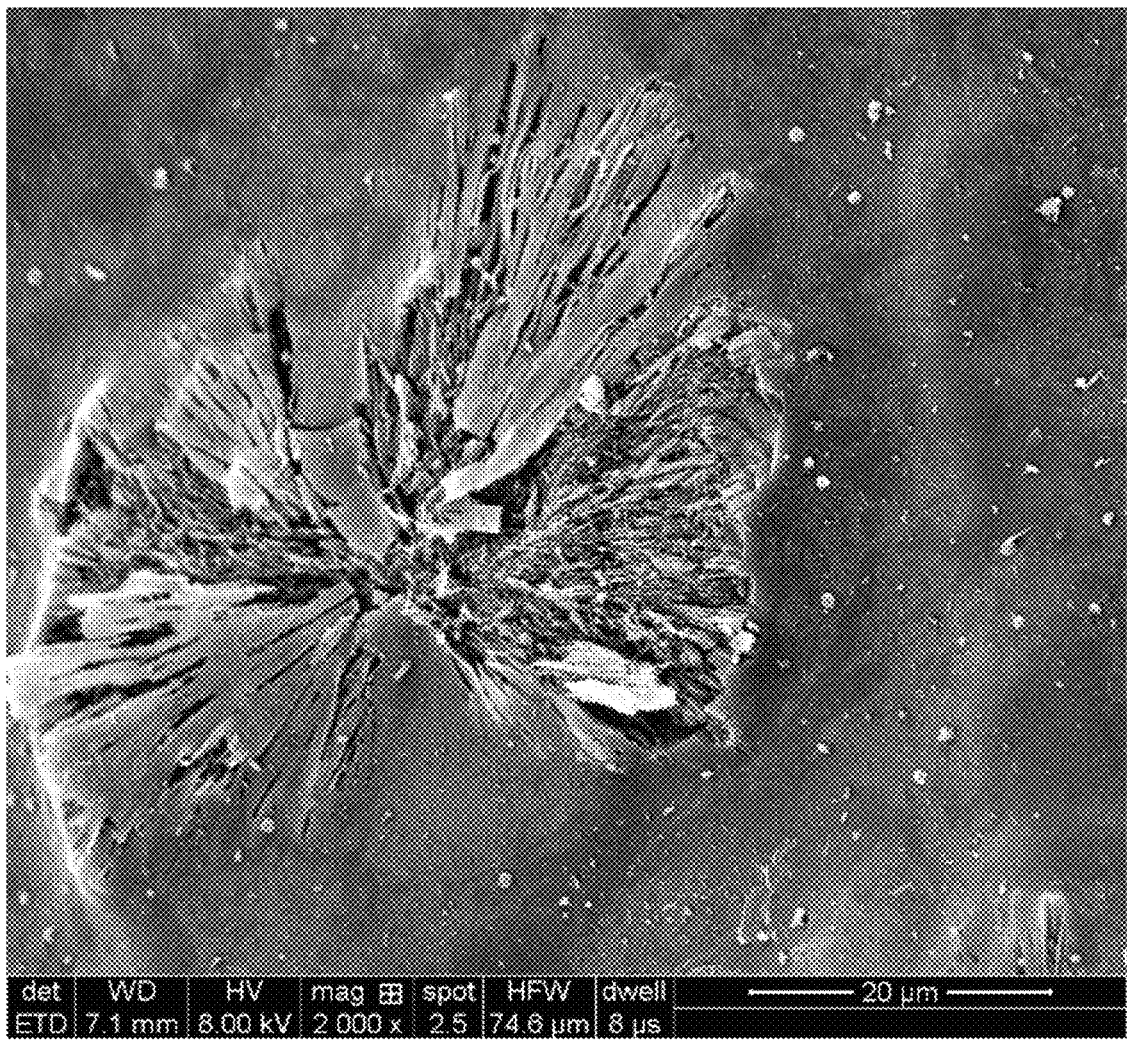
FIG. 1 shows the SEM image of the biochar prepared in Example 1.

*Enteromorpha prolifera* was lyophilized, and then 15 g of lyophilized *Enteromorpha prolifera* and 50 g of a phosphoric acid aqueous solution with a mass concentration of 60% were added to a beaker; the resulting mixture was well stirred, subjected to impregnation for 12 h, and dried in an oven for 24 h; then the dried sample was subjected to carbonization in a tube furnace at 700° C. for 1 h, and then cooled naturally; and the obtained sample was boiled with concentrated sulfuric acid for 0.5 h, washed with deionized water to neutrality, subjected to suction filtration, and dried at 90° C. for 12 h to obtain *Enteromorpha prolifera* biochar, which was labeled as EPB2. The *Enteromorpha prolifera* and the phosphoric acid in the phosphoric acid aqueous solution had a mass ratio of 1:2, and during the carbonization, the temperature was raised at a rate of 10° C./min. The SEM image of the prepared biochar is shown in FIG. 1.

Example 2

Figure 2:
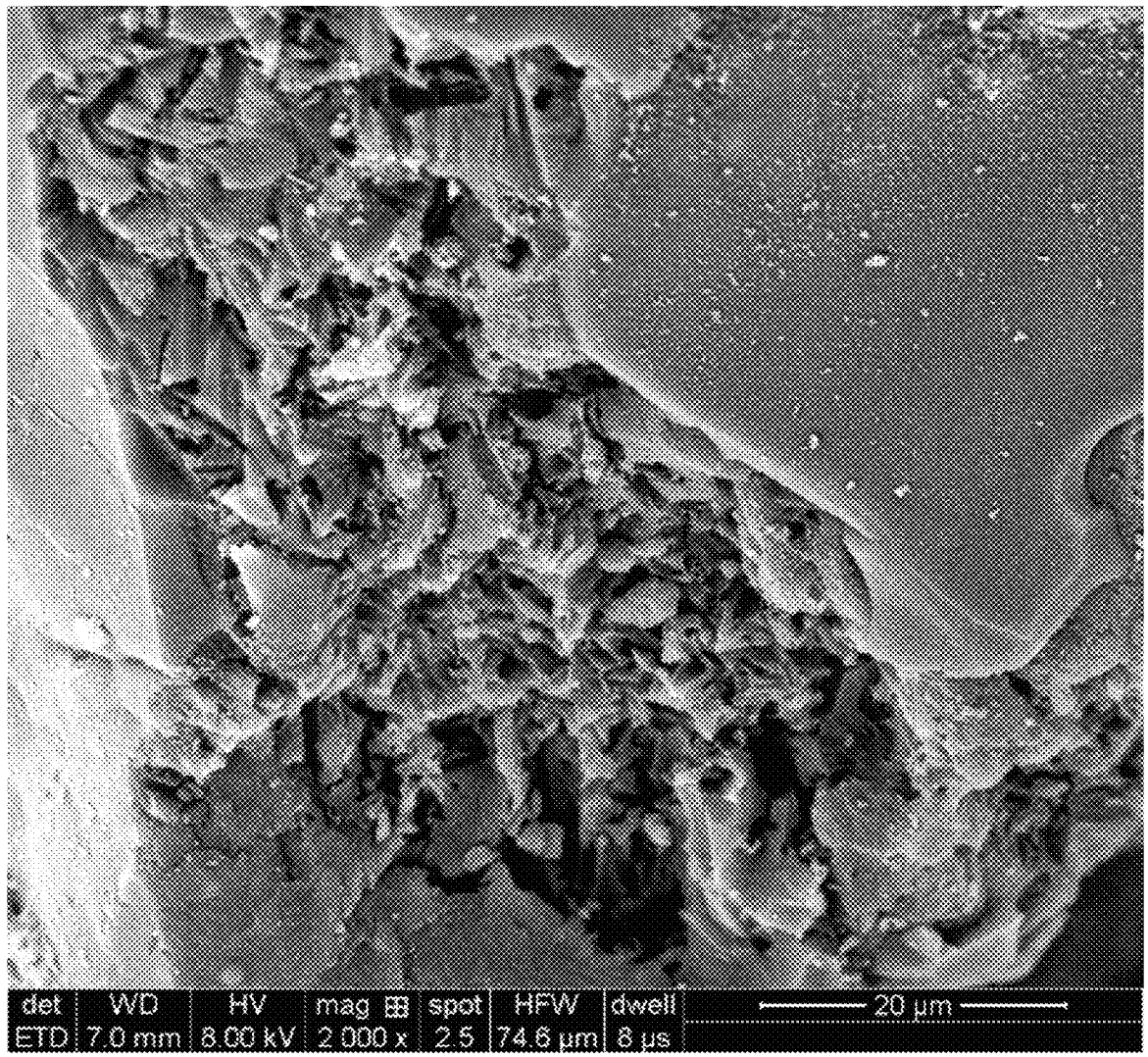
FIG. 2 shows the SEM image of the biochar prepared in Example 2.

*Enteromorpha prolifera* was lyophilized, and then 15 g of lyophilized *Enteromorpha prolifera* and 50 g of a phosphoric acid aqueous solution with a mass concentration of 90% were added to a beaker; the resulting mixture was well stirred, subjected to impregnation for 6 h, and dried in an oven for 12 h; then the dried sample was subjected to carbonization in a tube furnace at 400° C. for 5 h, and then cooled naturally; and the obtained sample was boiled with concentrated sulfuric acid for 2 h, washed with deionized water to neutrality, subjected to suction filtration, and dried at 100° C. for 24 h to obtain *Enteromorpha prolifera* biochar, which was labeled as EPB3. The *Enteromorpha prolifera* and the phosphoric acid in the phosphoric acid aqueous solution had a mass ratio of 1:3, and during the carbonization, the temperature was raised at a rate of 5° C./min. The SEM image of the prepared biochar is shown in FIG. 2.

Example 3

Figure 3:
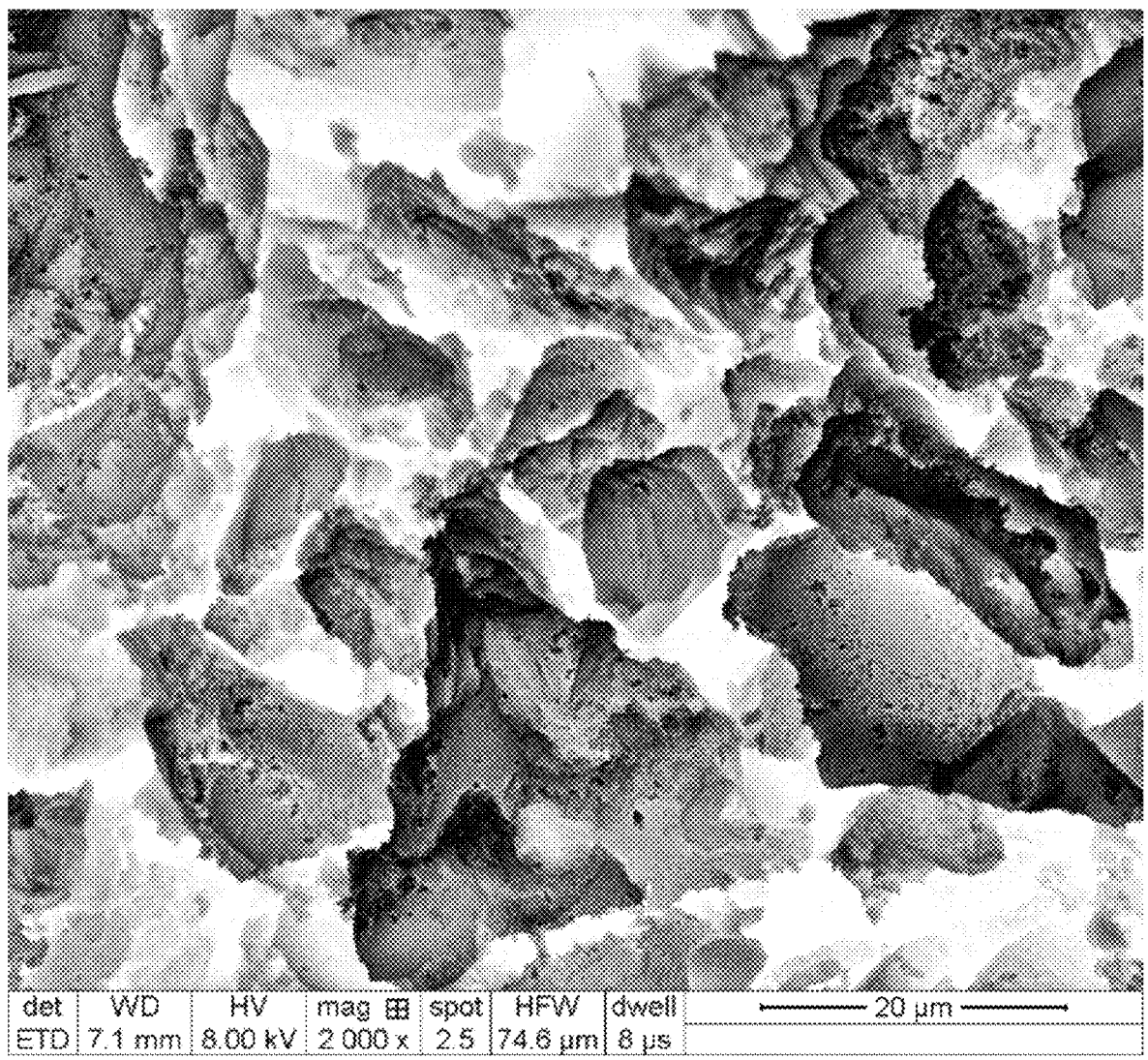
FIG. 3 shows the SEM image of the biochar prepared in Example 3.

*Enteromorpha prolifera* was lyophilized, and then 15 g of lyophilized *Enteromorpha prolifera* and 200 g of a phosphoric acid aqueous solution with a mass concentration of 30% were added to a beaker; the resulting mixture was well stirred, subjected to impregnation for 24 h, and dried in an oven for 18 h; then the dried sample was subjected to carbonization in a tube furnace at 1,000° C. for 3 h, and then cooled naturally; and the obtained sample was boiled with concentrated sulfuric acid for 1 h, washed with deionized water to neutrality, subjected to suction filtration, and dried at 105° C. for 18 h to obtain *Enteromorpha prolifera* biochar, which was labeled as EPB4. The *Enteromorpha prolifera* and the phosphoric acid in the phosphoric acid aqueous solution had a mass ratio of 1:4, and during the carbonization, the temperature was raised at a rate of 20° C./min. The SEM image of the prepared biochar is shown in FIG. 3.

Example 4

Figure 4:
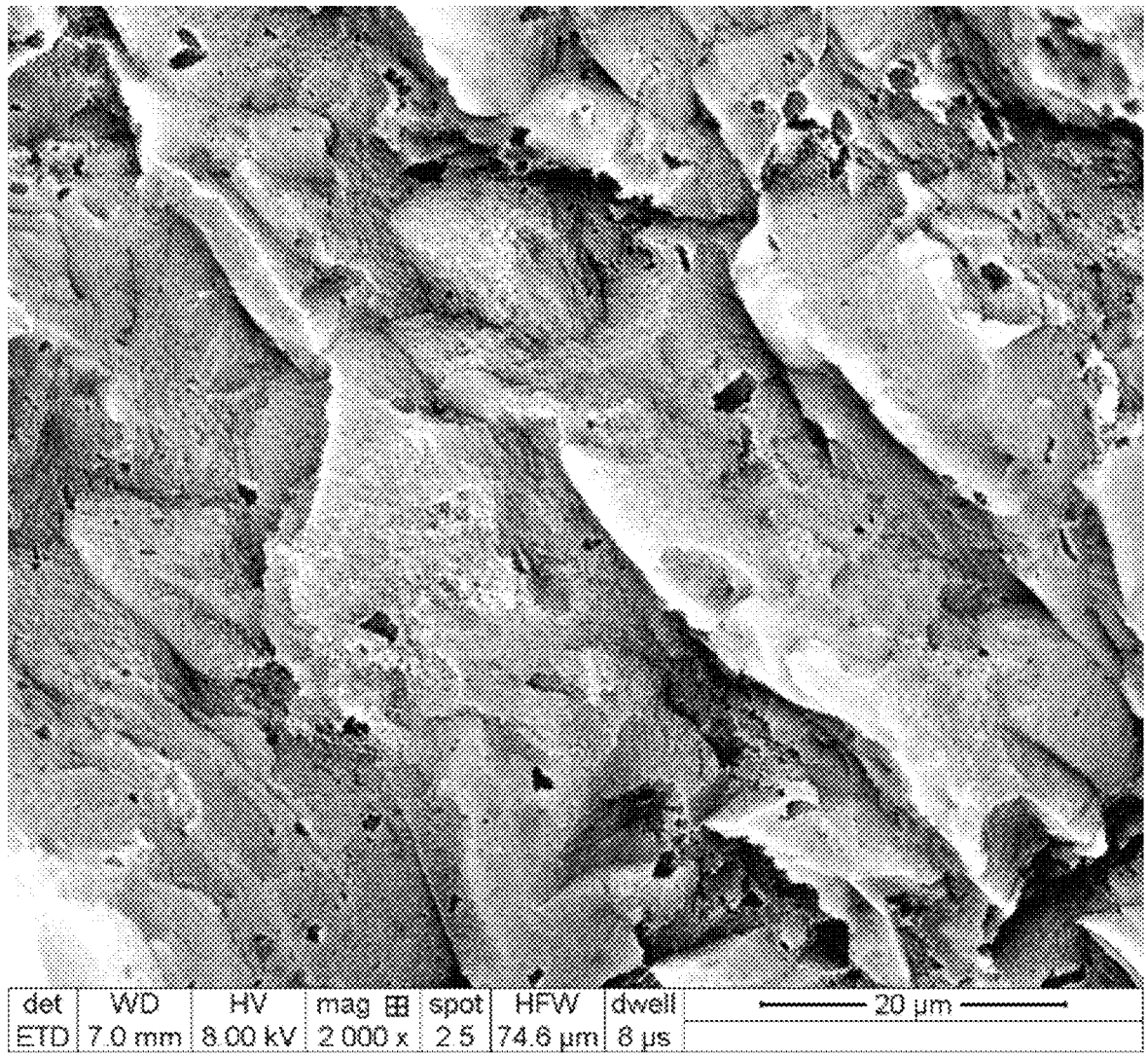
FIG. 4 shows the SEM image of the biochar prepared in Example 4.

*Enteromorpha prolifera* was lyophilized, and then 15 g of lyophilized *Enteromorpha prolifera* and 125 g of a phosphoric acid aqueous solution with a mass concentration of 60% were added to a beaker; the resulting mixture was well stirred, subjected to impregnation for 12 h, and dried in an oven for 24 h; then the dried sample was subjected to carbonization in a tube furnace at 700° C. for 1 h, and then cooled naturally; and the obtained sample was boiled with concentrated sulfuric acid for 0.5 h, washed with deionized water to neutrality, subjected to suction filtration, and dried at 90° C. for 12 h to obtain *Enteromorpha prolifera* biochar, which was labeled as EPB5. The *Enteromorpha prolifera* and the phosphoric acid in the phosphoric acid aqueous solution had a mass ratio of 1:5, and during the carbonization, the temperature was raised at a rate of 10° C./min. The SEM image of the prepared biochar is shown in FIG. 4.

Adsorption Performance Test:

The adsorption process was as follows: 20 mg of biochar corresponding to each of Example 1, Example 2, Example 3 and Example 4 was weighed and added to a 50 ml centrifuge tube, then 25 ml of a cadmium solution with a concentration of 30 mg/L to 250 mg/L was added, and the pH was adjusted to 7; a blank control was set; the samples were shaken in a constant-temperature shaker at 25° C. for 24 h, then centrifuged, and filtered; and the cadmium ion concentration was determined by AAS. The adsorption capacity was calculated based on the difference between the cadmium concentrations before and after the adsorption.

Table 1 shows the determination data for the cadmium ion adsorption capacity of the biochar sample prepared in each example.

The modified biochar products corresponding to Example 1, Example 2, Example 3, and Example 4 are EPH2, EPH3, EPH4, and EPH5, respectively.

TABLE 1

The effect of different initial reaction concentrations on the adsorption of cadmium (mg/g) by biochar

| Concentration of cadmium solution (mg/L) | Type of biochar | | | |
|---|---|---|---|---|
| | EPH2 | EPH3 | EPH4 | EPH5 |
| 30 | 6.16 | 33.17 | 35.59 | 19.13 |
| 50 | 21.62 | 53.25 | 47.19 | 25.53 |
| 100 | 46.56 | 63.25 | 74.88 | 50.68 |
| 150 | 60.60 | 182.40 | 106.56 | 59.86 |
| 200 | 78.88 | 219.00 | 137.75 | 77.00 |
| 250 | 78.59 | 254.53 | 146.56 | 62.19 |

Note:
mg/g represents mg of heavy metals adsorbed per g of biochar.

The biochar prepared in each example shows a prominent adsorption effect for cadmium. When the cadmium solution has a concentration of 250 mg/L, the biochar corresponding to each example exhibits the highest adsorption capacity; EPB5 has a lower adsorption capacity of 62.19 mg/g than other biochar products, which is higher than the normal adsorption capacity achieved in the prior art (about 50 mg/g); and EPB3 has a higher adsorption capacity of 254.53 mg/g, which is more than five times the normal adsorption capacity achieved in the prior art (about 50 mg/g). The adsorption capacity achieved in the disclosure is relatively higher compared with other studies, and thus the disclosure has a high industrial application value.

Those skilled in the art can appropriately change the conditions and routes with reference to the content of this specification to implement the technical solutions disclosed and proposed in the disclosure. Although the method and preparation technology of the disclosure have been described through preferred examples, the relevant technical personnel apparently can modify or recombine the methods and technical routes described herein without departing from the content, spirit and scope of the disclosure to realize the final preparation technology. In particular, it should be noted that all similar replacements and modifications are obvious to those skilled in the art, and the replacements and modifications are all deemed to be included in the spirit, scope and content of the disclosure.

What is claimed is:

1. A method for preparing biochar from *Enteromorpha prolifera*, the method comprising:
    subjecting *Enteromorpha prolifera* to lyophilization, then impregnating lyophilized *Enteromorpha prolifera* with phosphoric acid, and drying;
    grinding a dried mixture in a mortar, and then subjecting the ground sample to activation treatment in a tube furnace at 400° C. to 1,000° C. under a nitrogen atmosphere; and
    boiling an obtained solid product with concentrated hydrochloric acid, then washing with ultrapure water, and drying to obtain *Enteromorpha prolifera* biochar.

2. The method according to claim 1, wherein, a weight ratio of the *Enteromorpha prolifera* to the phosphoric acid is 1:(2-5); and the phosphoric acid has a weight concentration of 30% to 90%.

3. The method according to claim 1, wherein, during the impregnation process, the *Enteromorpha prolifera* is impregnated with the phosphoric acid for 6 h to 24 h.

4. The method according to claim 1, wherein, the drying is conducted at 90° C. to 105° C. for 12 h to 24 h.

5. The method according to claim 1, wherein, during the activation treatment, the temperature is raised at a rate of 5° C./min to 20° C./min, and the activation treatment is conducted for 1 h to 5 h.

6. The method according to claim 1, wherein, the obtained solid product is boiled for 0.5 h to 2 h with a concentrated hydrochloric acid solution having a concentration of 3 mol/L to 12 mol/L.

7. A method of using biochar, the method comprising:
    obtaining biochar prepared by the method according to claim 1; and adsorption of cadmium with the biochar.

* * * * *